United States Patent [19]

Auman

[11] Patent Number: 4,817,216

[45] Date of Patent: Apr. 4, 1989

[54] WATER-SAVING FLUSHING ATTACHMENT

[76] Inventor: David Auman, 624 S. Virginia Ave., Belleville, Ill. 62220

[21] Appl. No.: 194,977

[22] Filed: May 17, 1988

[51] Int. Cl.⁴ .......................... E04D 1/14; E04D 3/12
[52] U.S. Cl. ....................................................... 4/325
[58] Field of Search ..................... 4/324, 325, 405, 415

[56] References Cited

U.S. PATENT DOCUMENTS

| | | | |
|---|---|---|---|
| 3,745,591 | 7/1973 | Girten | 4/1 |
| 3,945,056 | 3/1976 | Kowalski | 4/325 |
| 4,115,881 | 9/1978 | Stone | 4/326 |
| 4,122,564 | 10/1978 | Addicks | 4/326 |
| 4,175,295 | 11/1979 | Cameron | 4/327 |
| 4,356,576 | 11/1982 | Gala | 4/661 |
| 4,364,129 | 12/1982 | Schonger | 4/324 |
| 4,388,737 | 6/1983 | Wenzel | 4/415 |
| 4,406,024 | 9/1983 | Chiu | 4/324 |
| 4,411,029 | 10/1983 | Haung | 4/324 |
| 4,412,362 | 11/1983 | Nylund | 4/388 |
| 4,561,131 | 12/1985 | David | 4/326 |

Primary Examiner—Charles E. Phillips
Attorney, Agent, or Firm—Don W. Weber

[57] ABSTRACT

A water-saving flushing device for a toilet tank is presented comprising a hollow casing and a rotatably attached pivot-plate secured inside said casing. A first pin pivotably secures an upper latch arm to said pivot-plate arm while a second pin pivotably secures a lower stop arm. A third pin is attached to the pivot plate. A float arm is attached to the third pin by means of a spring. The float arm rises or falls according to the water level in the toilet tank. To effectuate a partial flush, the flushing lever is pushed downward once. The travel of the flushing arm upward is limited by striking the upper latch arm. This limited path also limits the flapper valve to a partial opening only. When the mechanism is thus tripped, the latch arm rapidly recedes into the casing and a lower stop arm is forced outward to stop the downward travel of the flushing arm. As the water drains and then fills, the mechanism re-cocks itself. A second flushing motion in rapid succession to the first opens the flapper valve for a full flush when needed.

7 Claims, 4 Drawing Sheets

WATER-SAVING FLUSHING ATTACHMENT

BACKGROUND OF THE INVENTION

Water shortages are being reported in areas of the country that have never before experienced or expected water problems. States with a history of water shortages, such as California, Arizona, Texas, and New Mexico are constantly exploring resources to increase their water reserves or to conserve existing water supplies to meet their ever expanding needs. However, the shortage of potable water is not limited to the Sunbelt states, but has also occurred in many urbanized or industrialized states. Three inter-related phenomenon have become miore and more obvious and have contributed to the current water crisis in the United States. Urban populations in the Sunbelt regions have exploded; the demand for industrial use water has been constantly accelerating; and, there has been an increase in the degree of pollution of the existing natural water sources. These three phenomenon have exacerbated the problem and made a solution crucial to the economic and physical well-being of this country and the world. Water utility companies have predicted that in the near future there will be a severe water shortage in many areas of the country which will result in the enforcement of restrictive measures to conserve fresh water. Much has been said concerning the resulting effects of water shortages and much could also be said regarding the causes that have created the problem. However, identifying the problem and the causes has little or no effect in solving the crisis. It thus appears that the most effective means of dealing with the water shortage crisis is to explore more efficient means to conserve the existing fresh water supplies.

One place in which the water supply is used daily is in the area of toilets. It has been estimated that the average household toilet tank contains a reservoir of from 4.5 to 8 gallons of water and that as much as 2.5 to 4 gallons of water per toilet flush could be saved simply by recognizing the fact that a full flush is not needed for most waste disposal purposes.

A toilet normally provides the function of evacuating human organic waste. However, often times it is used to dispose of other matter which does not necessarily need the entire 4.5 to 8 gallons of water in the tank to dispose of the waste. Toilet tanks are designed with an "overkill" in mind. These tanks utilize far too much water for many ordinary flushing purposes. The water not only disposes of the waste in the bowl, but also is used to wash, clean, and rinse the internal surface of the wall of the toilet bowl during each flushing cycle. The cleansing function is necessary only for a small fraction of the total number of flushes needed during the lifetime of a toilet. It has been estimated that the average savings for a family of four which use a dual flush system (differentiating the purpose of the flush and the types of matter disposed) would save approximately 20,000 to 25,000 gallons of water per year. When considering this amount per household to include apartment units, motels, hotels, office buildings, condominiums, or other structures, the savings could constitute a substantial contribution to the water conservation effort. Since there has been a notable increase in the commercial use of the domestic toilet in both new construction and remodeling projects, the estimates of water saving could go much higher.

A search of patents relating to water conservation discloses a common interest among the inventors in the household toilet as a target for inventive efforts, each with the same objective, to conserve water.

There are a number of devices that attack the problem of saving water in a flushing cycle. However, most of these devices are either complicated to install, require a modification of the existing sanitary structures or are unattractive or cumbersome. Other devices which attempted to solve the problem of a dual flush system necessitated modification or changes to the existing systems. Many were not compatible with the existing toilet flush systems, or required unusually complicated activating mechanisms which were not easily installed by the average consumer. Additionally, these devices have a high maintenance requirement and are complicated to use, particularly for young adults or children.

It is the intent of this invention to contribute to the water conservation effort by making available an improved device which has been designed to reduce the amount of water presently used to dispose of liquid waste in a toilet bowl. The invention described herein meets the dual flush requirement to control the amount of water used for the type of waste disposed.

It is a primary object of this invention to provide a device that will control the two selected amounts of flush water in accordance with the type of waste to be disposed. It is a further object of this invention to provide a dual flush device that is simple to operate, easy to install, and that is compatible with most past and present day toilet flush systems. The device is marketed as a do-it-yourself kit economically made which requires no tools or mechanical skills for installation. The device itself is of a sturdy construction and has only four moving parts. The parts are noncorrosive and thus require no maintenance. Once installed, which takes less than 10 minutes, the device is simple to operate. One merely pushes the flush control on the exisfsting toilet once for a half flush. If a full flush is required, the flush control is pushed down two times in succession thus enabling the toilet bowl to flush completely and use all of the water in the toilet tank. The device also has a fail-safe capability in the event of a malfunction which automatically recycles or reverts the toilet to the original full flush standby capability. Due to the unique construction of this invention, no parts on the existing toilet need be removed or modified. Additionally, the entire device fits inside the tank and is completely out of view. Unlike many half-flush devices known in the art, one need not hold down a handle or otherwise depart from the normal operation of an ordinary flushing system to properly utilize this invention.

Other and further objects of this invention will become obvious upon reading the following description and specification.

BRIEF SUMMARY OF THE INVENTION

This invention comprises an acrylic casing which has two openings at the side thereof and one at the bottom. Inside the casing is a pivot-plate which rotates about an axial pivot pin. The pivot-plate has two other pins thereon to pivotably secure an upper latch arm and a lower stop arm. The upper latch arm and lower stop arm alternately protrude out of the upper and lower side openings. A float arm is slidably attached inside the casing. The upper part of the float arm is cut-out so that it may move up and down with respect to the casing. A third stationary pin on the pivot-plate is attached to the upper part of the float arm by a spring. The lower part of the float arm has a float attached thereto. A flushing arm extension is attached to the flushing arm of the toilet tank and the casing is attached to the tank so that the free end of the extension is in a position to mechanically activate the upper latch arm when the device is cocked. The float and float arm rise and fall according to the level of water in the tank.

The operation of the device is as follows. Pushing the flushing arm downward (one time) as in a normal flush, will activate the device. The flushing arm (existing component) controls the opening of the flapper valve (existing component) and as the flushing arm travels upward (the beginning of the flush cycle), it is stopped by the protruding upper latch arm. This action holds the flapper valve to a partial flush.

The upward motion of the flushing arm also unlatches the restrained (cocked) upper latch arm permitting it to move rapidly inward (into the body of the device). This procedure simultaneously frees the lower stop arm and allows the lower stop arm to move rapidly outward to provide a temporary stop to the downward travel of the flushing arm.

As the flushing arm rests on the protruding lower stop arm, the flapper valve is held open to effect the partial flush. As the flush water recedes, the float, which moves up and down with the water level, will at a predetermined level withdraw the lower stop arm thereby allowing the flushing arm to move downward to its original resting position. This same action closes the flapper valve, thus completing the partial flush operation.

A full flush is obtained by functioning the flushing arm two successive times. This action will, on the second flush function, fully open the flapper valve for a full flush operation.

Upon completion of a full or partial flush, the flush control system automatically recycles to the full tank standby condition. In the event a malfunction should occur, the fail-safe feature allows the toilet to revert to the original full flush operation. In the event the flush procedure is aborted, the system will automatically recycle itself.

DETAILED DESCRIPTION OF THE PREFERRED EMBODIMENT

Figure 1:
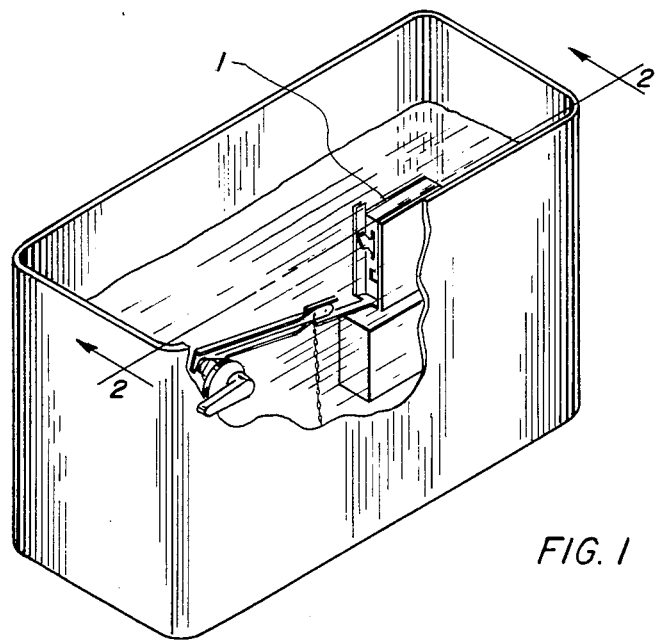
FIG. 1 is a perspective cut-out view of the device installed in a toilet tank.

The main body of this invention and all other component parts are formed by machine injection molding of high impact plastic. The casing (1) comprises two essentially square front and back portions, top and bottom edges, and back edges. A first side (2) of the casing has a first upper (3) opening and a second (4) opening therein. The bottom (5) of the casing has a third opening (6). On the side of the casing having the opening are guide flanges (23), best shown in FIG. 3. These flanges guide the path of a flushing arm extension (22). Inside the hollow casing is a pivot-plate (6) that is made of acrylic material and is essentially triangular in shape. This pivot-plate is rotatably secured to the casing by means of an axial pin (7). The pivot-plate is allowed to freely rotate on the pin during operation of the mechanism.

Figure 3:
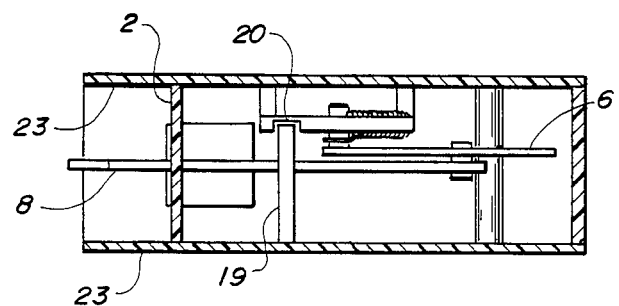
FIG. 3 is an upper cross-sectional view of the lines 2—2 in FIG. 2.
Figure 4:
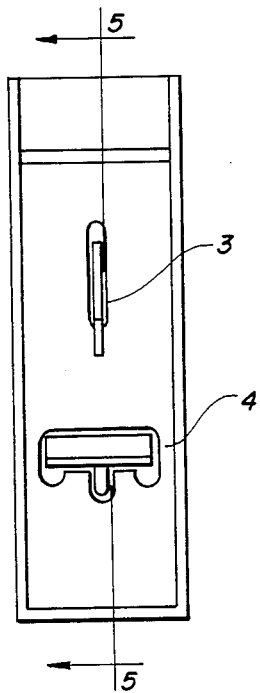
FIG. 4 is a partial end view of the device showing the upper and lower slots.
Figure 5:
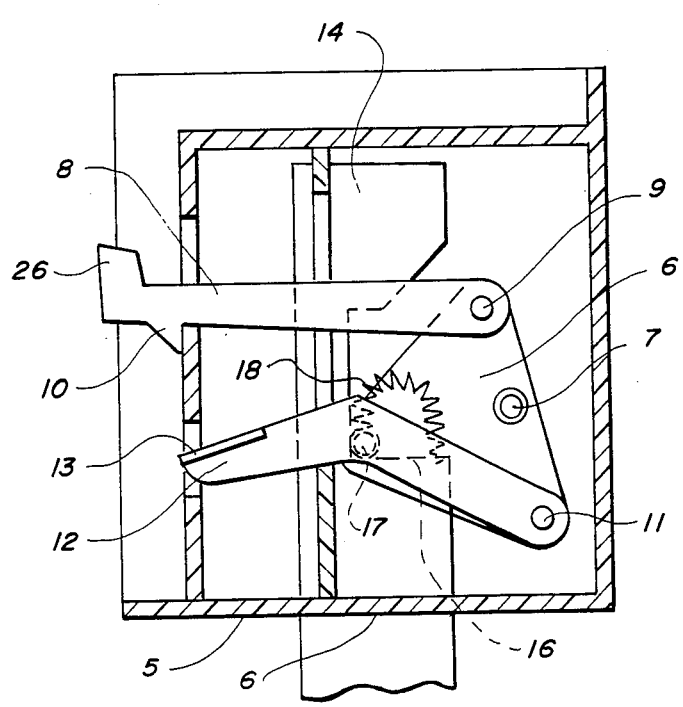
FIG. 5 is a cross-sectional view of the device shown in its cocked position, taken along lines 5—5.

Secured to an upper first point on the pivot-plate is an upper latch arm (8). This upper latch arm is pivotably attached to an upper first point by a first pivot pin (9). The upper latch arm has an irregular shape as shown in FIG. 5. The upper latch arm protrudes out the upper first opening in the side. The upper latch arm has a lower lip (10) that temporarily latches the arm to the side of the casing when the mechanism is in the cocked position. The upper latch arm also has an upper lip (26) that causes the half-flush, as explained later. The upper latch arm is pivotably attached to the front of the pivot-plate as best shown in FIG. 3.

Figure 8:
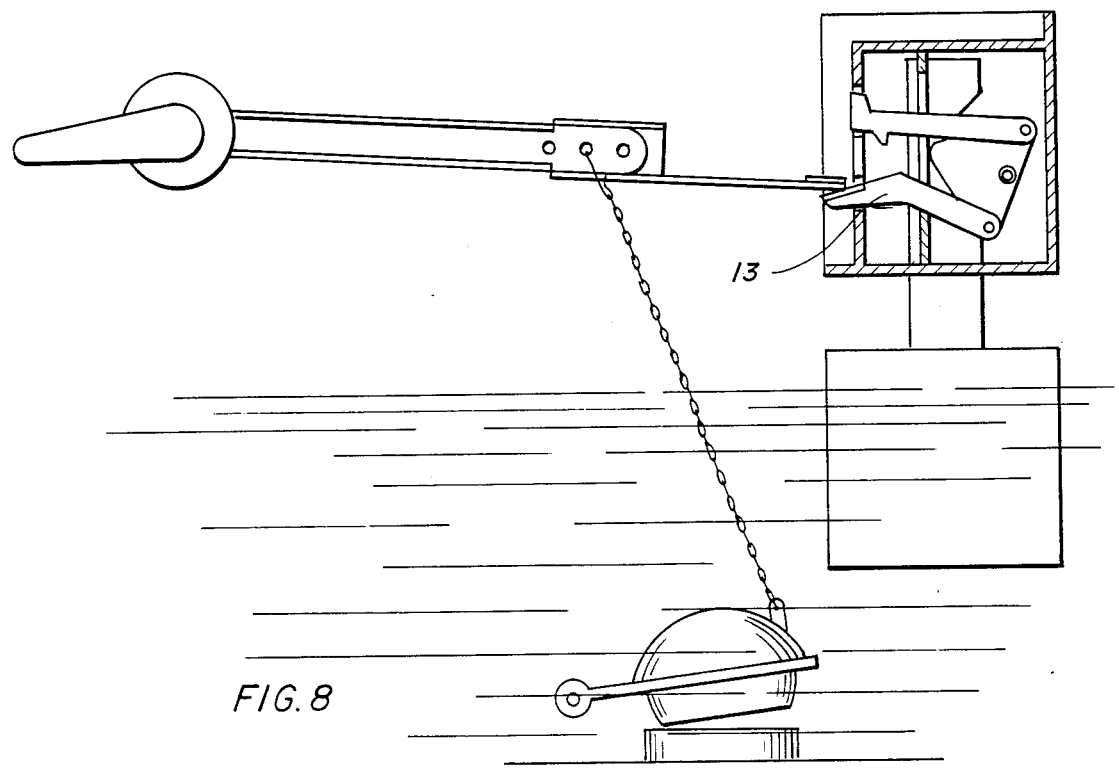
FIG. 8 shows the device with the flapper valve slightly opened and the flushing arm resting on the lower stop arm as the water recedes.

To a second lower point is attached an oblique lower stop arm (12) which has an oblique angle therein and is shaped as shown in FIG. 5. The oblique stop arm is pivotably attached to the front side of the pivot-plate by a second pivot pin (11). The free end of the oblique stop arm has a stop trip platform (13). The oblique stop arm (13) remains inside the casing when the mechanism is cocked (as shown in FIG. 6) but protrudes out the lower second side opening (4) when the mechanism is tripped, as shown in FIG. 8.

Attached to the pivot-plate is a float arm (14). The float arm is essentially rectangular as shown in FIG. 6 and has secured to its lower portion a suitable float (15). The upper position of the float arm has an irregular shaped cut from it, said shape best shown in FIG. 5. The irregular shape has a bottom horizontal leg (16). A third pin (17) protrudes from the front of the pivot-plate and has a spring (18) attached to it. The other end of the spring is attached to the edge of the bottom horizontal leg of the cut-out. The float arm is kept in place by a tongue and groove guide best shown in FIG. 3. The back side of the float arm has a vertical groove cut therein. Vertically attached to the inside of the casing is a guide tongue (19) which fits inside the vertical groove (20) in the float arm. The float arm slides up and down through the bottom opening (6) of the casing. The third pin (17) prohibits the float arm from falling below a certain point when the water has drained from the tank.

Figure 2:
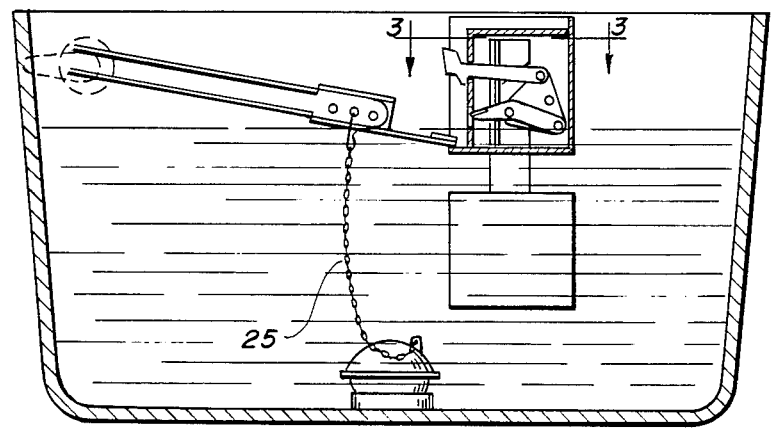
FIG. 2 shows a cross-sectional view of the device in its cocked, standby position.

Installation of the device is simple and requires no tools. Installation may be conveniently accomplished in ten minutes or less. To install the device, one simply removes the lid of the toilet tank and secures the flush control device to the front inside wall of the tank by using a spring loaded clamping device, provided with the mechanism and located on the back of the mechanism. This spring loaded clamping device holds the mechanism in place on the toilet tank by the spring pressure. Most domestic toilets have a flushing lever which is attached to a flushing arm (21). A flushing arm extension (22) is attached to the free end of the flushing arm, as shown in FIG. 6. The casing is then secured to the side of the toilet tank so that the flushing arm extension (22) fits inside the guide flanges (23). The flushing arm extension rests on the bottom of the casing as shown in FIG. 2 when the mechanism is cocked and the flush tank is filled and ready for use. A special fail-safe adaptor (27) is located on the outer tip of the flushing arm extension. The flushing arm extension (22) has a longitudinal slot (27') at its tip which enable the flushing arm extension to move downward despite the abberant presence of the upper latch arm. The fail-safe adaptor is pivotably attached to the top of the flushing arm extension. In the event of a malfunction, while the flushing arm extension is thus able to move downwardly past the upper latch arm should that arm remain in a protruded position because of a malfunction, the fail-safe adaptor will not allow the flushing arm extension to move upward without tripping the upper latch arm because of its location and pivot.

Figure 6:
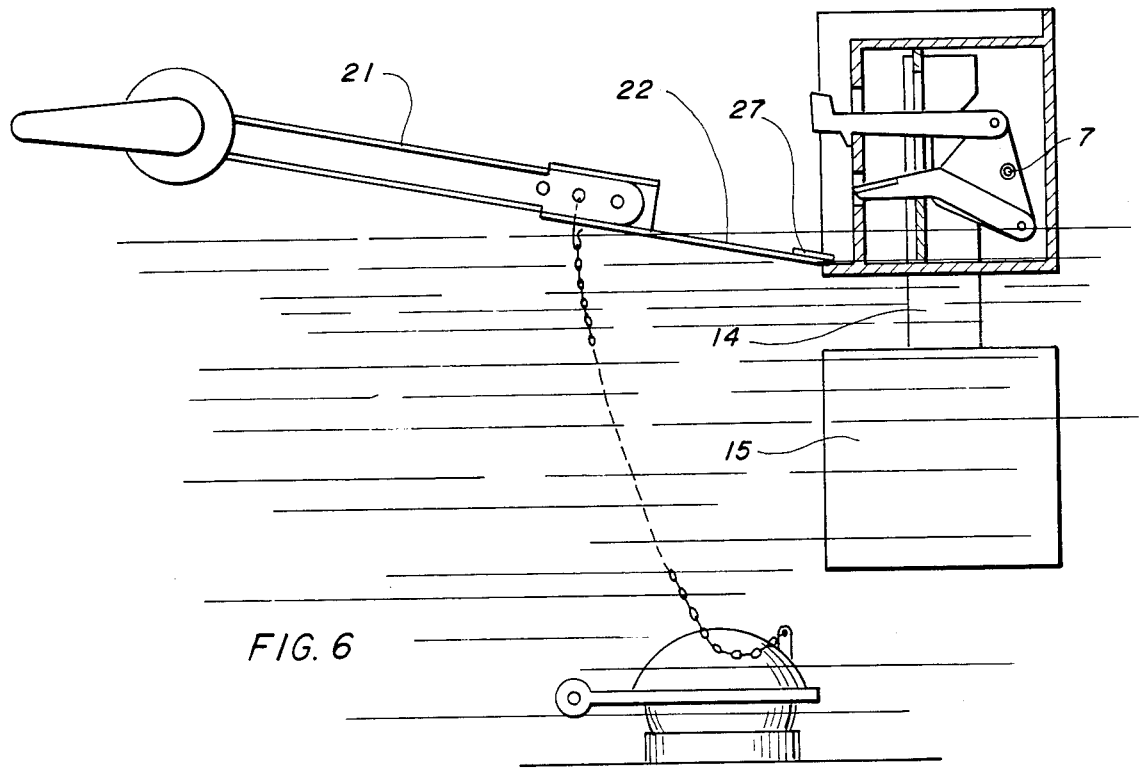
FIG. 6 is a view similar to that in FIG. 2 showing the device in its normal standby mode.
Figure 7:
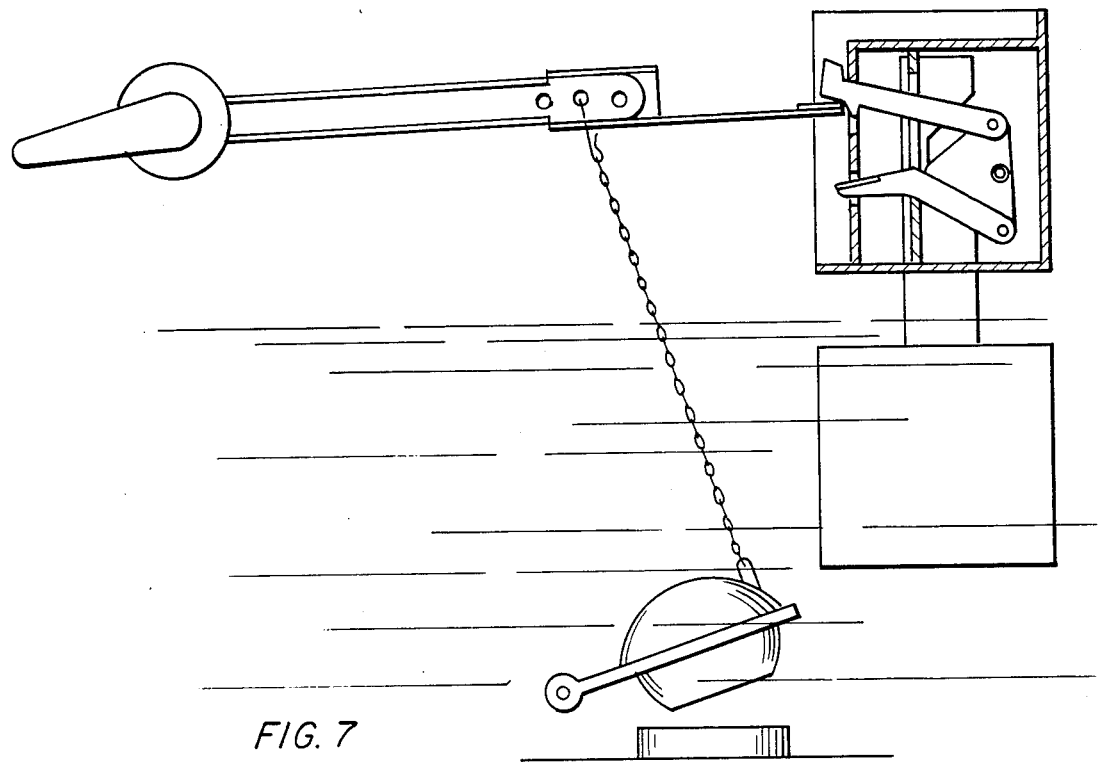
FIG. 7 shows the device in its partial flush mode, with the flapper valve slightly opened.

As shown in FIG. 6, when the mechanism is in the stand-by mode, the flushing arm extension rests on the bottom of the casing. The upper latch arm protrudes from the upper side opening and the oblique stop arm is inside the casing. When the flushing lever is activated by its normal downward motion, the flushing arm with extension is forced upward. When the flushing arm extension (22) strikes the upper latch arm (8), the upper latch arm is forced upward and the spring (18) acts against the third pin to rapidly rotate the third pin upwards. This upward rotation retracts the upper latch arm as the pivot plate rotates and forces the oblique stop arm (12) out the lower second opening. The upward movement of the flushing arm also opens the flapper valve, as shown in FIG. 7. The flapper valve is connected to the flushing arm in the normal manner by a chain (25).

Upon releasing the flushing lever, the flushing arm with extension comes to rest on the stop arm platform which now protrudes from the lower second opening since the mechanism has been tripped.

Pushing the flushing lever once makes the flushing arm-extension contact the lower part of the latch arm. The upper lip (26) of the latch arm prohibits the flushing arm from travelling all the way to the top of the tank, and hence the flapper valve opens only partially, as best shown in FIGS. 7 and 8. This action causes only a partial flush since the flapper valve only open partially.

In a rapid manner, the oblique lower stop arm (12) protrudes outwardly and stops the flushing arm on its downward path as shown in FIG. 8. The flapper valve is thus held only partially open.

Figure 10:
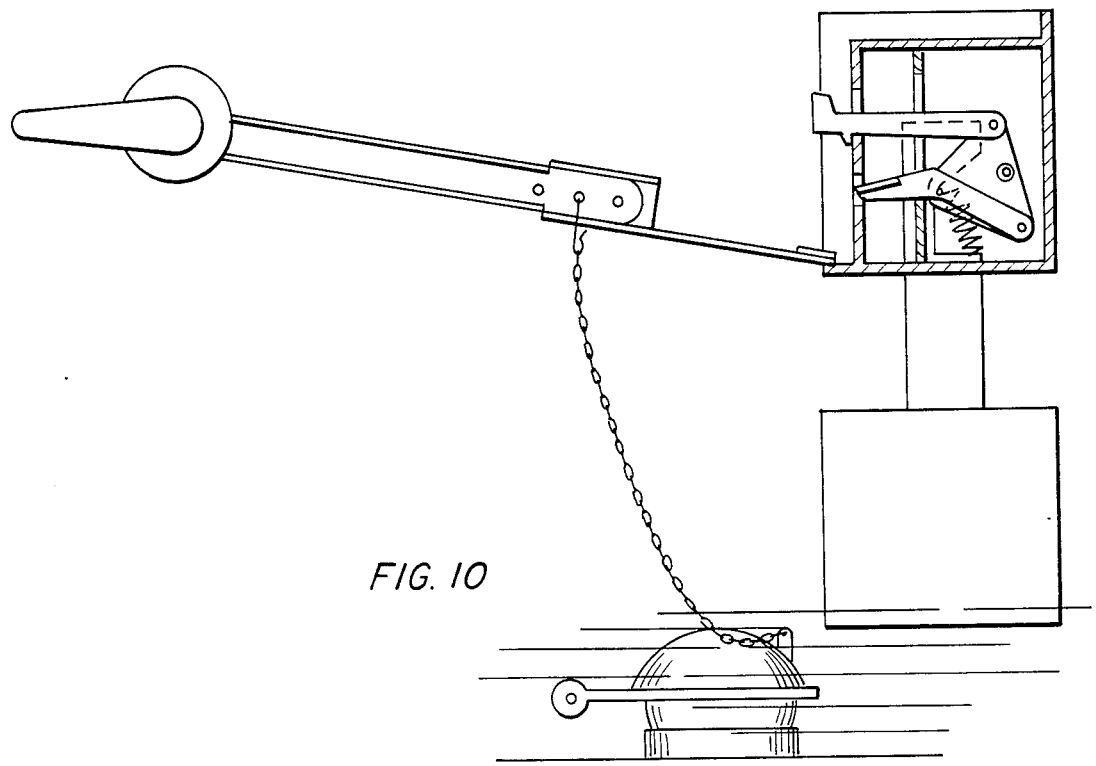
FIG. 10 shows the device in its normal standby mode similar to FIG. 6.

As the water in the tank recedes, the float (15) will move gradually downward which then causes the pivot-plate to rotate, thus withdrawing the oblique stop arm. As the stop arm is withdrawn into the casing, the flushing arm is allowed to return to its lower position (as shown in FIG. 10) and the flapper valve is closed. As the tank then begins to re-fill, the float rises, re-cocking the mechanism.

Figure 9:
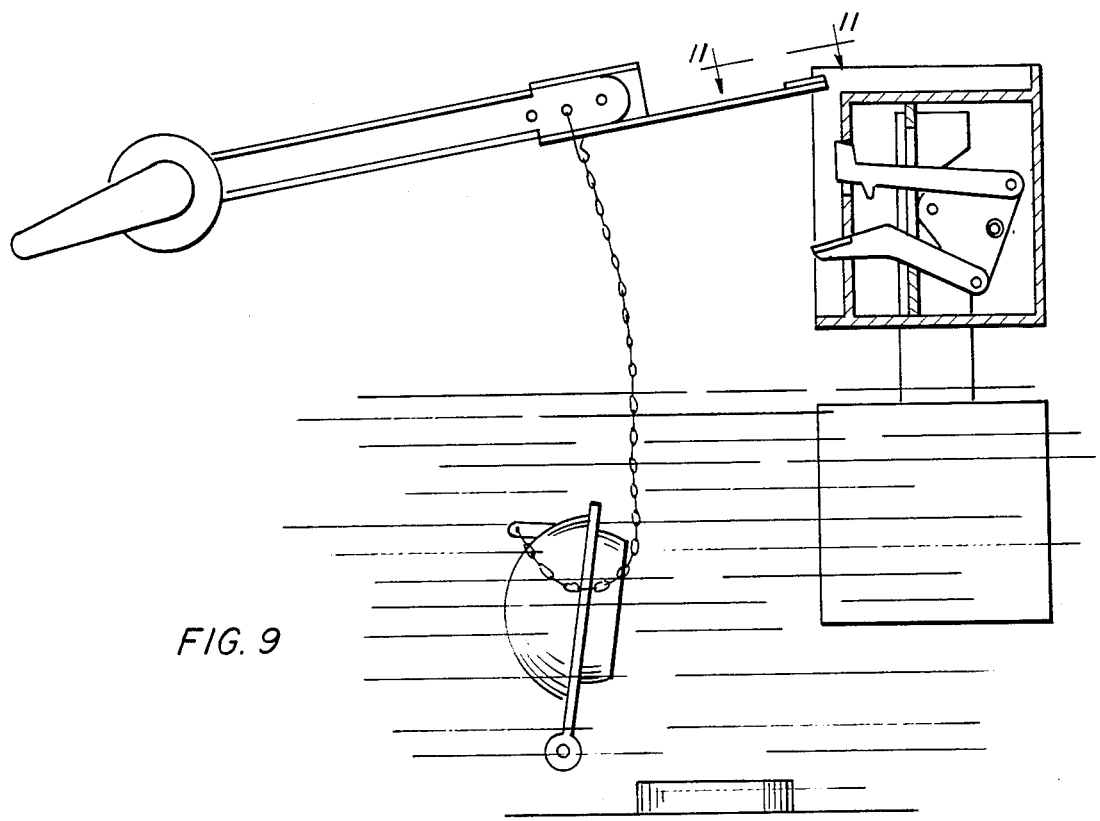
FIG. 9 shows the device in a full-flush mode with the flapper valve in its open position and the flushing arm at the height of its vertical travel.
Figure 11:
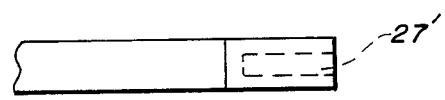
FIG. 11 shows a detail view of the end of the flushing arm extension with the fail-safe adaptor down.

A full-flush is obtained by pushing the flushing lever downward twice in succession. The first downward motion operates the mechanism as in a partial flush described above. However, a second downward motion forces the flushing arm all the way up as the first motion tripped the mechanism and the upper latch arm is nearly instantaneously withdrawn. The higher level of the flushing arm opens the flapper valve completely, as shown in FIG. 9. Upon completion of a partial or full flush, the flush control system automatically recycles to the full tank standby condition.

The entire unit herein described is preferably made of durable, high-impact, acric plastic. The choice of materials described herein as meant as illustration only and not as limitation. Other suitable noncorrosive materials may be used.

It is obvious that minor variations of construction or use of materials may be used and the description of the preferred embodiment above described is means as illustration only and not as a limitation. Minor variations in design are contemplated by this invention while still remaining within the spirit thereof.

Having fully described the embodiment and method of operation of my invention, I claim:

1. A water-saving attachment to a toilet tank, comprising:
   (a) a hollow casing having a first side with first and second openings therein and a bottom with a third opening therein, said casing being attached to the inside of a toilet tank by attaching means;
   (b) a pivot-plate rotatably secured to the inside of said casing by an axial pin;
   (c) a latch arm having one end thereof pivotably secured to said pivot-plate by a first pivot pin and having the other end thereof protruding from said first side opening when the mechanism is in a cocked position;
   (d) an oblique lower stop arm having one end thereof pivotably secured to said pivot-plate by a second pivot pin, the other end thereof protruding from said second side opening when the mechanism is in a tripped position;
   (e) a float arm having an irregular shape cut out therefrom to accomodate a third pin attached to said pivot plate, said third pin being attached to said float arm by a spring, said float arm extending through said third opening and having a float attached to the lower end thereof;
   (f) a flushing arm extension which is attached to the other end of a normal toilet tank flushing arm, said flushing arm extension being adapted to cooperate with the other ends of said latch arm and said lower stop arm to control the amount of water discharged from said flush tank.

2. A water-saving attachment to a toilet tank as in claim 1, said casing further comprising vertical guide flanges attached to the front and back edges of the first side of said casing.

3. A water-saving attachment to a toilet tank as in claim 1, wherein said pivot-plate is essentially triangular in shape.

4. A water-saving attachment to a toilet tank as in claim 1, said latch arm further comprising an upper lip attached to the upper part of the free end of said arm and a lower lip attached to the lower part of the free end of said arm.

5. A water-saving attachment to a toilet tank as in claim 1, said oblique arm further comprising a horizontal stop arm platform.

6. A water-saving attachment to a toilet tank as in claim 1, said float arm having a vertical groove therein, further comprising a vertical guide tongue which guides said float arm in a vertical path.

7. A water saving attachment to a toilet tank as in claim 1, wherein said flushing arm extension has a longitudinal slot therein further comprising a fail-safe adaptor pivotably secured on the upper side of the tip of said flushing arm extension.

* * * * *